Nov. 27, 1962    M. B. WIDESS    3,066,300
DISPLAYING SEISMIC SIGNAL CHARACTER
Filed Dec. 30, 1960    2 Sheets-Sheet 1

INVENTOR:
MOSES B. WIDESS
BY
ATTORNEY

Nov. 27, 1962 M. B. WIDESS 3,066,300
DISPLAYING SEISMIC SIGNAL CHARACTER
Filed Dec. 30, 1960 2 Sheets-Sheet 2

*INVENTOR:*
MOSES B. WIDESS
BY Newell Potter
*ATTORNEY*

United States Patent Office 3,066,300
Patented Nov. 27, 1962

3,066,300
DISPLAYING SEISMIC SIGNAL CHARACTER
Moses B. Widess, Fort Worth, Tex., assignor to Pan American Petroleum Corporation, Tulsa, Okla., a corporation of Delaware
Filed Dec. 30, 1960, Ser. No. 79,752
6 Claims. (Cl. 346—109)

This invention relates to seismic geophysical surveying and is directed particularly to a novel method and apparatus for displaying the seismic signals. More particularly, the invention relates to displaying seismic signals in the form of oscillographic traces which especially facilitate study of the wave character.

In seismic geophysical surveying, seismic waves are generally created by detonating an explosive charge in the earth, and the wave energy resulting therefrom is detected by a spread of seismic detectors spaced at some distance from the initiation point. The outputs of the seismic detectors are recorded usually as parallel traces on a recording medium, most commonly as magnetic tracks on a magnetic recording medium. Subsequently, the magnetic tracks are played back with appropriate relative time-shifting of the various tracks and are recorded in side-by-side relationship on a photographic or other record-receiving surface as a visible cross-section display. One common method of recording the traces of such a display is as oscillographic traces or wiggly lines, while another is as variable-density traces in which the recording medium is varied from gray or black to white, with intermediate tones, in accordance with the peaks and troughs of the oscillographic trace.

Both types of display have certain advantages, and it has become a fairly common practice to imprint both upon a photographic record medium, with each wiggly-line trace centered over the corresponding variable-density trace. The variable-density display is particularly useful for visualizing gross relationships and general trends of the data, while the oscillographic traces are best for studying individual wavelet forms and for timing the arrival of the different impulses.

While the oscillographic traces are useful for studying variations of wave character from trace to trace, it is frequently not easy for the eye to ascertain the exact amplitude relationships where these variations are small. In some respects, the lack of a zero-reference line or trace axis makes it difficult to visualize the amplitude relationship of successive peaks and troughs of the wave forms. Also, while low-amplitude signals may contain data of significance, their trace-to-trace correlation and variations may not be obvious as they are in the case of high-amplitude signals. Further in testing multi-channel amplifier systems for similarity of response of the different channels, small but significant differences of response are frequently difficult to see.

In view of the foregoing, it is a primary object of my invention to provide a novel and improved method and apparatus for seismic data display which, without sacrificing the advantages of variable-density and oscillographic traces, facilitates the exact study of wave character and the timing of trace zero crossings, and which emphasizes the variations of small-amplitude wave character. A further object is to provide such a method and apparatus for data display with a minimum modification of existing recording equipment. A still further object is to provide such a method and apparatus which is particularly useful for comparing different recording channels for detecting any substantial lack of identity between their responses. Other and further objects, uses, and advantages of the invention will become apparent as the description proceeds.

Briefly stated, the foregoing and other objects are accomplished by modifying a display of the type which superimposes a first oscillographic trace on a variable-density, constant-width trace by adding thereto a second oscillographic trace of opposite polarity which is recorded only during the times when the first oscillographic trace has a given polarity, such as during the positive deflections. Preferably, this is accomplished by simultaneously applying the signal to be recorded to two recording galvanometers connected in opposite phase electrically but otherwise of identical sensitivity. Both galvanometers are focused to the same position on the recording medium, but the beam of one is interrupted by masking or other means during negative (for example) trace deflections. Thus, duplicates of the positive peaks are recorded by it on the negative side of the trace zero axis for ready comparison with adjacent negative peaks. Furthermore, the different galvanometer beams are preferably so directed as to double the photographic exposure of the traces where they intersect at the trace zero axis.

While the invention is most readily adaptable to the sequential recording of multiple traces one at a time, it can also be applied to the simultaneous recording of a number of traces, as will be pointed out. The exact nature of the invention will be better understood from the ensuing description taken with reference to the accompanying drawings forming a part of this application. In these drawings, FIGURE 1 is a diagrammatic illustration, partially in perspective, of parts of a recording system embodying the invention;

Figure 1:
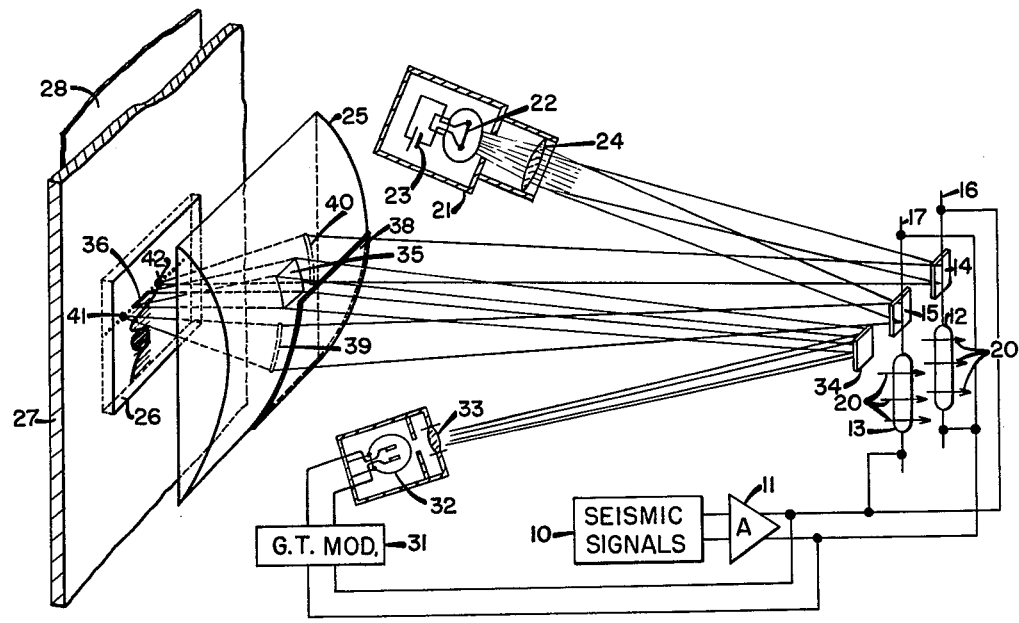

Referring now to these drawings in detail and particularly to FIGURE 1 thereof, in this figure is shown a single-trace recorder which produces a multiple-trace display by recording one trace at a time and shifting to the next trace position between passes. Thus, a source of seismic signals 10 is connected through an amplifier 11 to a pair of mirror-galvanometer coils 12 and 13. While the source 10 might conceivably be a seismometer or seismometer group in use for field recording, it is preferably a previously recorded magnetic trace reproducible by a magnetic reproducing head as a corresponding electric signal into the amplifier 11.

The galvanometer coils 12 and 13 are normally placed in a strong magnetic field, indicated by the arrows 20, and have respectively attached to their suspension wires 16 and 17 the reflecting mirrors 14 and 15. Light from a source 21 containing a linear filament energized by a voltage supply 23 is focused by a lens 24 onto the mirrors 14 and 15 and thence through a cylindrical lens 25 and a recording aperture 26 onto a photographic record-receiving medium 28 behind the opaque wall 27 of a light-tight housing.

The output signals from amplifier 11 are preferably also applied through a glow-tube modulator 31 to a glow tube 32 which produces a varying light intensity in accordance with varying instantaneous amplitudes of the seismic signals. This varying-intensity light is focused by a lens 33 onto a fixed mirror 34 near galvanometer mirrors 14 and 15 and travels thence as a beam 35 through the cylindrical condensing lens 25 onto a linear region 36 on record medium 28.

In accordance with the present invention, the cylindrical collimating or condensing lens 25, which is normally unobstructed, here has its lower right quadrant covered by a patch 38 of opaque film or tape, which adheres to the lens surface and cuts off the transmission of light therethrough. Further in accordance with the invention, the mirror 14 is preferably tilted so that its beam 40 strikes the surface of lens 25 immediately above the upper edge of opaque film 38, so that it impinges on the recording medium 28 at point 42. The beam 39 of galvanometer 15, on the other hand, preferably is tilted to strike the surface of lens 25 just below the upper edge of mask 38, so as to be focused to the point 41 on medium 28 for positive wave cycles, but to be cut off by the opaque patch 38 for negative wave cycles. Since the signal currents travel in opposite directions through the respective galvanometer coils 12 and 13, and the galvanometers are of equal sensitivity, the deflections of the recording spots 41 and 42 are respectively equal and opposite. Thus, as the record medium 28 is moved past aperture 26 in a direction at right angles to the line 36 and to the deflections of spots 41 and 42, both a variable-density trace and two line-deflection traces are recorded simultaneously. Spots 41 and 42 are shown in deflected position. For zero signal they coincide in the center of line 36 and preferably just to the left of the vertical edge of mask 38.

Figure 4:
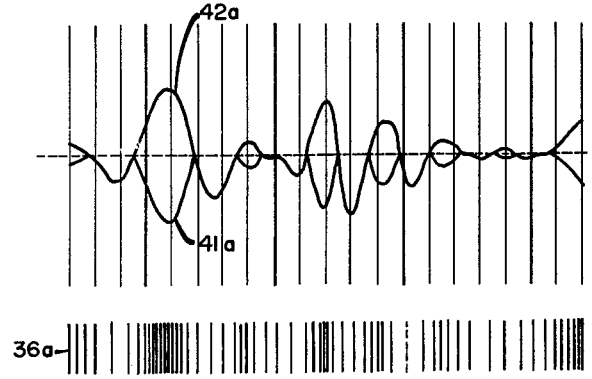
FIGURE 4 is a drawing of side-by-side variable-density and variable-deflection traces which are normally recorded superimposed.

The appearance of these traces is as shown in FIGURE 4 where for clarity the variable-density trace 36a has been placed to one side of the deflection traces 41a and 42a. As will be clear, each positive deflection of the trace 42a above the zero line of the trace, which zero line is indicated in FIGURE 4 but is not normally present on a record display, is mirrored by an exactly similar deflection 41a below the trace axis. Negative deflections of trace 42a, however, are not similarly duplicated above the trace zero axis. As the overlap of the two recording spots 41 and 42 is preferably so arranged as to double the exposure on the zero axis, by alignment of the galvanometer mirrors 14 and 15 for zero signal amplitude, the zero crossings of the trace 42a are accordingly accentuated, and their timing is facilitated by the added photographic density.

As will be apparent also in FIGURE 4, a visual comparison of the peaks of the trace 42a, in the form of the troughs of trace 41a, to the adjacent troughs of trace 42a is greatly aided, both because the zero axis is designated by the double-exposed dots and because the eye can compare peak and trough heights of adjacent half-wave cycles simply by horizontal excursions between the trace 41a to the trace 42a. Further, small trace deflections are emphasized as to their exact time and character by the small closed loops. They can be compared trace to trace much more easily than the absolute trace deflections themselves in the absence of the loop-forming additional trace.

Figure 2:
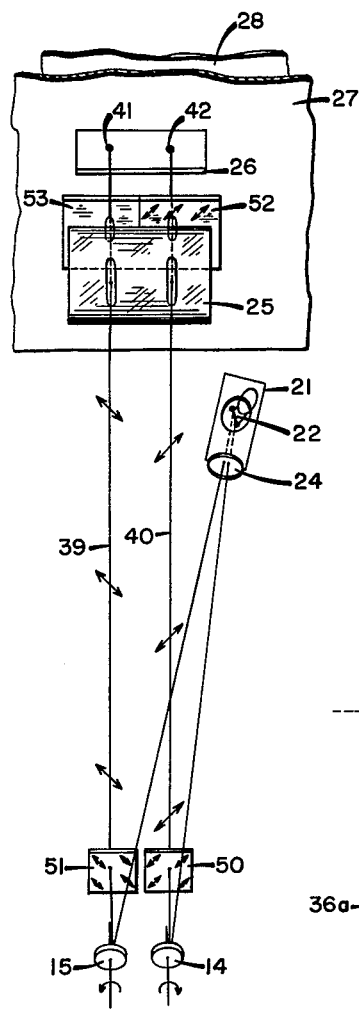
FIGURE 2 is a diagrammatic illustration of a modified form of the invention.

An alternative embodiment of the invention is shown in FIGURE 2. Instead of blanking off a portion of the collimating lens 25, use is here made of light polarization to obtain the desired transmission and cut-off of the different recording beams. For example, there is placed in the beam 40 of mirror 14 a small light-polarizing film 50 adapted to pass only light having effective vibrations in the plane defined by beam 40 and by the direction of small arrows on film 50. The beam 39 is similarly polarized by a polarizing film 51, like film 50, but with its polarizing axis oriented perpendicular to that of film 50, as indicated by the small arrows.

Between collimating lens 25 and aperture 26 is located a sheet 52 of polarizing material with its polarizing axis oriented parallel to that of film 50 and covering the right half of the field of lens 25, while the left half is covered by a neutral-density film 53. The density of film 53 is so chosen that the beam 40 is transmitted equally by it and by the polarizing film 52, so that the complete trace 42a is drawn with uniform exposure on medium 28. The beam 39, however, is transmitted only by the film 53 and is cut off by the polarizing film 52, so that it does not record on negative wave cycles. The variable-density recording beam 35 is not shown here, but is preferably polarized like beam 40 so as to pass equally through films 52 and 53.

It should be understood, however, that many of the advantages of the invention are retained even in the absence of the variable-density display, so that beam 35 can be omitted if desired in any given instance.

As will be obvious, the same object as is accomplished by the polarizing films 50 and 51 cooperating with the polarizing film 52 can be accomplished by different colors of light from the source 21, as by making the filters 50 and 51 of different complementary colors so that one will be cut off by the opposite filter 52. Thus, if the filters 50 and 52 transmit only yellow light, whereas the only light transmitted by filter 51 is blue, the yellow filter at 52 will effectively cut off negative cycles of the blue light beam.

Figure 3:
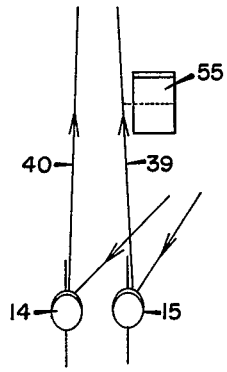
FIGURE 3 is a diagrammatic illustration of a further embodiment of the invention.

A still further embodiment is shown in FIGURE 3, where a small opaque baffle plate 55 is so located as to cut off positive swings of beam 39 at some point intermediate between mirror 15 and collimator lens 25. Plate 55 is carefully positioned so that beam 39 intersects its left edge just as recording spot 41 reaches the trace zero-axis position. The beam 39 remains cut off all the time it is to the right of this position, but because of the finite separation of the mirrors 14 and 15, beam 40 can undergo both positive and negative deflections without striking plate 55.

While this embodiment has the slight disadvantage that beam 39 is cut off less abruptly in crossing the trace zero-axis position than when the mask is on collimator lens 25, it has the advantages of being simple and adaptable to the recording of a number of traces simultaneously by additional pairs of galvanometers.

In view of the foregoing, it will be apparent to those skilled in the art that still other and further modifications of the method and apparatus are possible without departing from the spirit of the invention. The scope of the invention, therefore, should not be considered as limited to the details described, but it is properly to be ascertained from the appended claims.

I claim:

1. In seismic recording apparatus comprising a seismic signal source, a first mirror galvanometer actuated from said source, a photographic recording medium and means for moving said medium past a recording aperture, a light source and a lens system for directing a light beam from said source to the mirror of said galvanometer to be directed thereby through said recording aperture onto said medium, the improvement comprising a second mirror galvanometer in said light beam adjacent said first galvanometer, said second galvanometer being actuated by said source equally but in the opposite phase relative to said first galvanometer, the zero-signal points of impingement of the two galvanometer beams on said medium substantially coinciding, and means between said galvanometers and said medium for interrupting one of said galvanometer beams during each half cycle of a given polarity of the seismic signals.

2. In a seismic recorder, the combination, with a seismic signal source and a moving photosensitive recording medium, of a pair of equally sensitive mirror galvanometers connected to said source so as to simultaneously deflect light beams equally in opposite directions from a trace zero-axis position on said medium, and means between said galvanometers and said medium for interrupting the beam from one of said galvanometers while it is deflected in one direction from said position.

3. In a seismic recorder, the combination as in claim 2 wherein said interrupting means comprises a collimating lens having an opaque quadrant, and wherein said beams are tilted respectively to impinge upon and to bypass said quadrant.

4. In a seismic recorder, the combination as in claim 2 wherein said interrupting means comprises means for polarizing the light in the beams from said galvanometers in two perpendicular directions, and a polarizing film adjacent said medium with its polarizing axis parallel to one of said directions and covering said medium on one side of said trace zero-axis position.

5. In a seismic recorder, the combination as in claim 2, wherein said interrupting means compirises means for converting the light of said beams to two different complementary colors, and a filter passing essentially only one of said colors adjacent said medium and covering said medium on one side of said trace zero-axis position.

6. In a seismic recorder, the combination as in claim 2, wherein said interrupting means comprises an opaque mask close to one of said galvanometers and placed so that the beam of said one galvanometer intersects the edge of said mask in crossing the trace zero axis, while the beam of the other of said galvanometers bypasses said mask on both positive and negative deflections.

References Cited in the file of this patent

UNITED STATES PATENTS

| | | |
|---|---|---|
| 2,147,623 | Wender | Feb. 14, 1939 |
| 2,292,062 | Dimmick | Aug. 4, 1942 |
| 2,710,070 | Merten | June 7, 1955 |
| 2,852,330 | Stufflebeam et al. | Sept. 16, 1958 |
| 2,882,792 | Levine | Apr. 21, 1959 |